US012641390B2

(12) United States Patent
Mizuno et al.

(10) Patent No.: US 12,641,390 B2
(45) Date of Patent: May 26, 2026

(54) INFORMATION PROCESSING METHOD, INFORMATION PROCESSING DEVICE, AND RECORDING MEDIUM

(71) Applicant: Panasonic Intellectual Property Corporation of America, Torrance, CA (US)

(72) Inventors: Ko Mizuno, Osaka (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 315 days.

(21) Appl. No.: 18/374,164

(22) Filed: Sep. 28, 2023

(65) Prior Publication Data

US 2024/0031762 A1 Jan. 25, 2024

Related U.S. Application Data

(63) Continuation of application No. PCT/JP2022/003592, filed on Jan. 31, 2022.

(Continued)

(30) Foreign Application Priority Data

Dec. 7, 2021 (JP) ................................ 2021-198497

(51) Int. Cl.
*H04S 7/00* (2006.01)
*G10L 19/008* (2013.01)

(52) U.S. Cl.
CPC ............ *H04S 7/304* (2013.01); *G10L 19/008* (2013.01); *H04S 2400/11* (2013.01)

(58) Field of Classification Search
None
See application file for complete search history.

(56) References Cited

U.S. PATENT DOCUMENTS

2016/0123759 A1* 5/2016 Miller .................... G08G 1/005 701/400
2017/0188154 A1* 6/2017 Werris .................... H04S 7/304

(Continued)

FOREIGN PATENT DOCUMENTS

JP 2020-524420 8/2020
WO 2018/232327 12/2018

OTHER PUBLICATIONS

International Search Report issued Apr. 19, 2022 in International (PCT) Application No. PCT/JP2022/003592.

(Continued)

*Primary Examiner* — Qin Zhu
(74) *Attorney, Agent, or Firm* — Wenderoth, Lind & Ponack, L.L.P.

(57) ABSTRACT

An information processing method includes: obtaining a stream including (i) first position and orientation information indicating a position and an orientation of a sound source and (ii) a sound signal indicating a sound that the sound source outputs; obtaining second position and orientation information indicating a position and an orientation of a head of a user; and making a correction to reduce a rate of change at which a speed of the position or the orientation indicated in the second position and orientation information obtained changes relative to the position or the orientation of the sound source indicated in the first position and orientation information, to obtain the second position and orientation information to be used for three-dimensional sound processing to be performed using the first position and orientation information and the second position and orientation information on the sound signal.

10 Claims, 8 Drawing Sheets

Related U.S. Application Data

(60) Provisional application No. 63/173,659, filed on Apr. 12, 2021.

(56) References Cited

U.S. PATENT DOCUMENTS

| | | | | |
|---|---|---|---|---|
| 2018/0091922 | A1* | 3/2018 | Satongar | G06F 3/012 |
| 2019/0313201 | A1 | 10/2019 | Torres et al. | |
| 2020/0094141 | A1 | 3/2020 | Fersch et al. | |
| 2020/0160600 | A1* | 5/2020 | Leppänen | G06F 3/011 |
| 2023/0007430 | A1* | 1/2023 | Tsuchida | H04S 7/307 |

OTHER PUBLICATIONS

Nakamura, Akira et al., "Real time voice speed converting system with small impairments", The Journal of the Acoustical Society of Japan, vol. 50, No. 7, 1994, pp. 509-520, with its partial English translation.

Extended European Search Report issued Sep. 20, 2024 in corresponding European Patent Application No. 22787809.7.

* cited by examiner

| D | Less than 1 m | 1 m to 3 m | 3 m to 20 m | More than or equal to 20 m |
|---|---|---|---|---|
| Spatial resolution | 10 degrees | 30 degrees | 45 degrees | 90 degrees |
| Time response length | 10 ms | 50 ms | 200 ms | 1 s |

INFORMATION PROCESSING METHOD, INFORMATION PROCESSING DEVICE, AND RECORDING MEDIUM

CROSS REFERENCE TO RELATED APPLICATIONS

This is a continuation application of PCT International Application No. PCT/JP2022/003592 filed on Jan. 31, 2022, designating the United States of America, which is based on and claims priority of U.S. Provisional Patent Application No. 63/173,659 filed on Apr. 12, 2021 and Japanese Patent Application No. 2021-198497 filed on Dec. 7, 2021. The entire disclosures of the above-identified applications, including the specifications, drawings and claims are incorporated herein by reference in their entirety.

FIELD

The present disclosure relates to an information processing method, an information processing device, and a recording medium.

BACKGROUND

Techniques that perform processing (also called three-dimensional sound processing) on sound signals to be output according to the position and orientation of a sound source and the position and orientation of a user who is a hearer to enable the user to experience three-dimensional sounds have been known (see Patent Literature (PTL) 1).

CITATION LIST

Patent Literature

PTL 1: Japanese Unexamined Patent Application Publication (Translation of PCT Application) No. 2020-524420

Non Patent Literature

NPL 1: Real time voice speed converting system with small impairments (1994). The Journal of the Acoustical Society of Japan, 509-520.

SUMMARY

Technical Problem

However, an abrupt change in the position of a sound source that a user becomes aware of based on a sound signal on which the three-dimensional sound processing has been performed causes a problem for the user to hear a detail of a sound that the sound source outputs.

In view of the above, the present disclosure provides an information processing method, etc. that prevent difficulty of hearing a detail of a sound that a sound source outputs.

Solution to Problem

An information processing method according to one aspect of the present disclosure includes: obtaining a stream including (i) first position and orientation information indicating a position and an orientation of a sound source and (ii) a sound signal indicating a sound that the sound source outputs; obtaining second position and orientation information indicating a position and an orientation of a head of a user; and making a correction to reduce a rate of change at which a speed of the position or the orientation indicated in the second position and orientation information obtained changes relative to the position or the orientation of the sound source indicated in the first position and orientation information, to obtain the second position and orientation information to be used for three-dimensional sound processing to be performed on the sound signal, the three-dimensional sound processing being performed using the first position and orientation information and the second position and orientation information.

Note that these comprehensive or specific aspects may be implemented by a system, a device, an integrated circuit, a computer program, or a recording medium such as a computer-readable CD-ROM, or by any optional combination of systems, devices, integrated circuits, computer programs, and recording media.

Advantageous Effects

An information processing method according to the present disclosure can prevent difficulty of hearing a detail of a sound that a sound source outputs.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
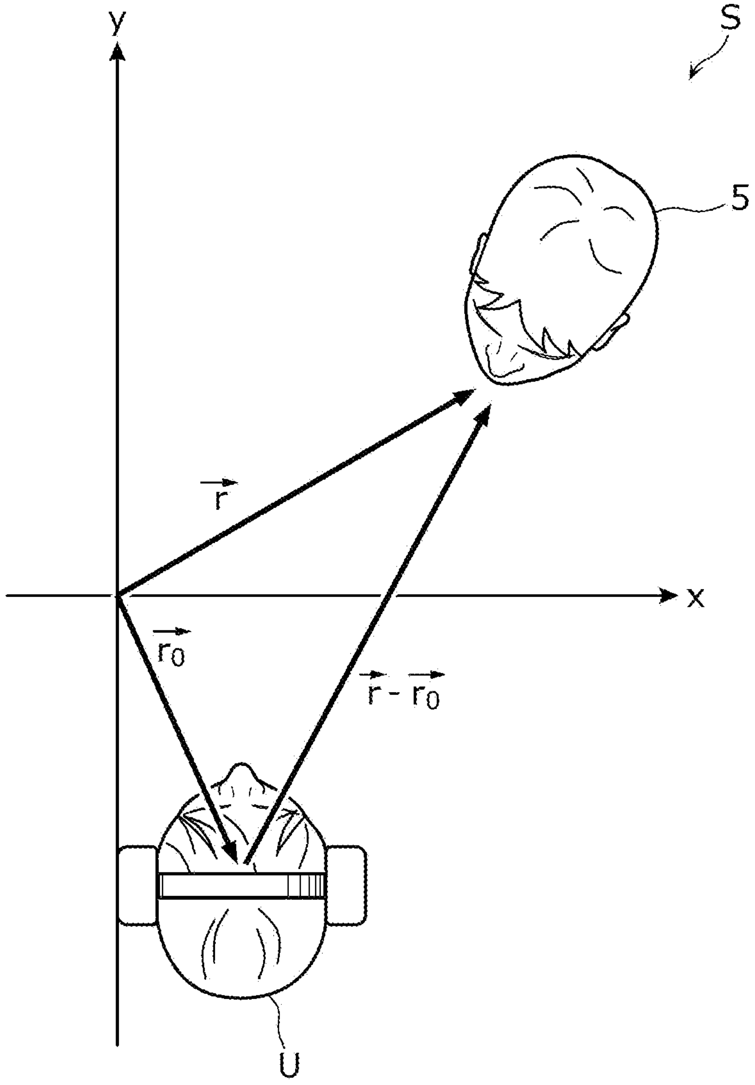
FIG. 1 is a diagram illustrating an example of a positional relationship between a user and a sound source according to an embodiment.

DESCRIPTION OF EMBODIMENT (Underlying Knowledge Forming Basis of the Present Disclosure)

The inventors of the present application have found occurrences of the following problems relating to the three-dimensional sound processing described in the "Background Art" section.

The three-dimensional sound processing technique disclosed by PTL 1 obtains future predicted pose information based on the orientation of a user, and renders media content in advance using the predicted pose information.

However, an abrupt change in the position of a sound source that a user becomes aware of based on a sound signal on which the three-dimensional sound processing has been performed causes a problem for the user to hear a detail of a voice that the sound source outputs. The abrupt change in the position of a sound source is likely to occur when an orientation of the head abruptly changes by, for example, the user rolling their neck or moving their upper or lower body.

In order to provide a solution to a problem as described above, an information processing method according to one aspect of the present disclosure includes: obtaining a stream including (i) first position and orientation information indicating a position and an orientation of a sound source and (ii) a sound signal indicating a sound that the sound source outputs; obtaining second position and orientation information indicating a position and an orientation of a head of a user; and making a correction to reduce a rate of change at which a speed of the position or the orientation indicated in the second position and orientation information obtained changes relative to the position or the orientation of the sound source indicated in the first position and orientation information, to obtain the second position and orientation information to be used for three-dimensional sound processing to be performed on the sound signal, the three-dimensional sound processing being performed using the first position and orientation information and the second position and orientation information.

According to the above aspect, the three-dimensional sound processing is performed using a corrected position or a corrected orientation of the head of a user. Therefore, it is possible to prevent a relatively big change in a sound that the user is to hear, which may occur when a relatively big change has occurred in the position or the orientation of the head of the user. With this, a relatively big change in the position of a sound source that the user becomes aware of by hearing a sound is prevented, and thus the user can readily hear a detail of the sound that the sound source outputs. As described above, the above-described information processing method can prevent difficulty of hearing a detail of a sound that a sound source outputs.

In the making of the correction, when the rate of change exceeds a threshold, the second position and orientation information may be corrected to set, as the threshold, a rate of change at which a speed of the position or the orientation indicated in the second position and orientation information corrected changes, for example.

According to the above aspect, when a rate of change at which the speed of the position or the orientation of the head of a user changes relative to a sound source exceeds a threshold, information indicating the position or the orientation is corrected such that the rate of change is set as a threshold. Therefore, the rate of change at which the speed of the position or the orientation of the head of the user changes relative to the sound source can be set to be less than or equal to the threshold. As a consequence, it is possible to prevent a relatively big change in a sound that the user is to hear, which may occur when a relatively big change that exceeds a predetermined standard has occurred in the position or the orientation of the head of the user. As described above, the above-described information processing method can prevent difficulty of hearing a detail of a sound that a sound source outputs.

In the making of the correction, when the rate of change exceeds a threshold, the second position and orientation information may be corrected to indicate the position or the orientation that is delayed from the position or the orientation indicated in the second position and orientation information obtained, for example.

According to the above aspect, when a rate of change at which the speed of the position or the orientation of the head of a user changes relative to a sound source exceeds a threshold, a correction is made such that the change is delayed. Therefore, the rate of change at which the speed of the position or the orientation of the head of the user changes relative to the sound source can be set to be less than or equal to the threshold. As a consequence, it is possible to prevent a relatively big change in a sound that the user is to hear, which may occur when a relatively big change that exceeds a predetermined standard has occurred in the position or the orientation of the head of the user. As described above, the above-described information processing method can prevent difficulty of hearing a detail of a sound that a sound source outputs.

For example, the rate of change at which the speed of the position or the orientation changes may be a second derivative value of the position or the orientation with respect to time.

According to the above aspect, a rate of change at which the speed of the position or the orientation of the head of a user changes relative to a sound source can be readily obtained using a second derivative value of the position or the orientation of the head of the user relative to the sound source with respect to time. The position or the orientation of the head of the user can be appropriately corrected using the rate of change. Therefore, the above-described information processing method can more readily prevent difficulty of hearing a detail of a sound that a sound source outputs.

For example, the stream may further include type information indicating whether the sound indicated by the sound signal is a human voice or not. In the making of the correction, when the type information indicates that the sound indicated by the sound signal is a human voice, the correction may be made after the threshold is reduced.

According to the above aspect, a correction is made using a smaller threshold for three-dimensional sound processing to be performed on a human voice. Accordingly, a big change in the speed of a change in the position or the orientation of the head of a user relative to a sound source is prevented, particularly for the voice. Therefore, the above-described information processing method can further prevent difficulty of hearing a detail of a human voice that a sound source outputs.

For example, the stream may further include type information indicating whether the sound indicated by the sound signal is a human voice or not. In the making of the correction, when the type information indicates that the sound indicated by the sound signal is not a human voice, the correction may be made after the threshold is increased.

According to the above aspect, a correction is made using a larger threshold for three-dimensional sound processing to be performed on a sound other than a human voice. This allows a bigger change in the speed of a change in the position or the orientation of the head of a user relative to a sound source, and thus a delay in the change in the position or the orientation of the head of the user is reduced. The above has an advantage of enabling a reduction in a delay in the three-dimensional sound processing when there is less need to cause a detail of a sound other than a human voice to be readily heard as compared to a human voice. Therefore, the above-described information processing method can prevent difficulty of hearing a detail of a sound that a sound source outputs, while preventing a delay in the three-dimensional sound processing.

For example, the stream may further include type information indicating whether the sound indicated by the sound signal is a human voice or not. In the making of the correction, when the type information indicates that the sound indicated by the sound signal is not a human voice, the correction may be prohibited.

According to the above aspect, a correction is not made for three-dimensional sound processing to be performed on a sound other than a human voice. Accordingly, a delay in a change in the position or the orientation of the head of a user does not occur. The above has an advantage of enabling a further reduction in a delay in the three-dimensional sound processing when there is less need to cause a detail of a sound other than a human voice to be readily heard as compared to a human voice. Therefore, the above-described information processing method can prevent difficulty of hearing a detail of a sound that a sound source outputs, while preventing a delay in the three-dimensional sound processing.

For example, in the making of the correction, delay processing of delaying the sound signal by a delay time may be further performed. The delay time is a time for which a change in the position or the orientation indicated in the second position and orientation information is delayed by the correction.

According to the above aspect, a sound signal is delayed by a delay time for which a change in the position or the orientation indicated in second position and orientation information is delayed by a correction. Accordingly, it is possible to prevent a time difference that may occur between the three-dimensional sound processing to be performed based on the position or the orientation of the head of a user and a sound signal on which the three-dimensional sound processing is to be performed. Therefore, the above-described information processing method can further prevent difficulty of hearing a detail of a sound that a sound source outputs.

For example, in the making of the correction, reduction processing of reducing a delay caused by the delay processing may be further performed on a subsequent signal that is a sound signal subsequent to the sound signal on which the delay processing has been performed.

The above aspect contributes to recovering, by reduction processing, a delay in a sound signal that is caused to be delayed by delay processing. Therefore, the above-described information processing method can further prevent difficulty of hearing a detail of a sound that a sound source outputs.

In addition, an information processing device according to one aspect of the present disclosure includes: a decoder that obtains a stream including (i) first position and orientation information indicating a position and an orientation of a sound source and (ii) a sound signal indicating a sound that the sound source outputs; an obtainer that obtains second position and orientation information indicating a position and an orientation of a head of a user; and a corrector that makes a correction to reduce a rate of change at which a speed of the position or the orientation indicated in the second position and orientation information obtained changes relative to the position or the orientation of the sound source indicated in the first position and orientation information, to obtain the second position and orientation information to be used for three-dimensional sound processing to be performed on the sound signal, the three-dimensional sound processing being performed using the first position and orientation information and the second position and orientation information.

The above-described aspect produces the same advantageous effects as the above-described information processing method.

Moreover, a program according to one aspect of the present disclosure is a non-transitory computer-readable recording medium having recorded thereon a computer program for causing a computer to execute the above-described information processing method.

The above-described aspect produces the same advantageous effects as the above-described information processing method.

Note that these comprehensive or specific aspects may be implemented by a system, a device, an integrated circuit, a computer program, or a recording medium such as a computer-readable CD-ROM, or by any optional combination of systems, devices, integrated circuits, computer programs, or recording media.

Hereinafter, embodiments will be described in detail with reference to the drawings.

Note that the embodiments below each describe a general or specific example. The numerical values, shapes, materials, elements, the arrangement and connection of the elements, steps, orders of the steps, etc. presented in the embodiments below are mere examples, and are not intended to limit the present disclosure. Furthermore, among the elements in the embodiments below, those not recited in any one of the independent claims representing the most generic concepts will be described as optional elements.

Embodiment

This embodiment describes an information processing method, an information processing device, etc. which prevent difficulty of hearing a detail of a sound that a sound source outputs.

FIG. 1 is a diagram illustrating an example of a positional relationship between user U and sound source 5 according to an embodiment.

FIG. 1 illustrates user U present in space S and sound source 5 that user U is aware of. Space S in FIG. 1 is illustrated as a flat surface including the x axis and y axis, but space S also includes an extension in the z axis direction. The same applies throughout the embodiment.

Space S may be provided with a wall surface or an object. The wall surface includes a ceiling and also a floor.

Information processing device 10 (see FIG. 2 that will be described later) performs three-dimensional sound processing that is digital sound processing based on a stream including a sound signal that sound source 5 outputs to generate a sound signal caused to be heard by user U. The above stream further includes position and orientation information including the position and orientation of sound source 5 in space S. A sound signal generated by information processing device 10 is output through a loudspeaker as a sound, and the sound is heard by user U. The loudspeaker is assumed to be a loudspeaker included in earphones or headphones worn by user U, but the loudspeaker is not limited to the foregoing examples.

Sound source 5 is a virtual sound source (typically called a sound image), namely an object that user U who has heard the sound signal generated based on the stream is aware of as a sound source. In other words, sound source 5 is not a generation source that actually generates a sound. Note that although a person is illustrated as sound source 5 in FIG. 1, sound source 5 is not limited to humans. Sound source 5 may be any optional sound source.

User U hears a sound that is based on a sound signal generated by information processing device 10 and is output from a loudspeaker.

The sound output from the loudspeaker based on the sound signal generated by information processing device 10 is heard by each of the left and right ears of user U. Information processing device 10 provides an appropriate time difference or an appropriate phase difference (to be also stated as a time difference, etc.) for the sound heard by each of the left and right ears of user U. User U detects a direction of sound source 5 for user U, based on the time difference, etc. of the sound heard by each of the left and right ears.

In addition, information processing device 10 causes the sound heard by each of the left and right ears of user U to include a sound (to be stated as a direct sound) corresponding to a sound directly arriving from sound source 5 and a sound (to be stated as a reflected sound) corresponding to a sound output by sound source 5 and is reflected off a wall surface before arrival. User U detects a distance from user U to sound source 5 based on a time interval between the direct sound and the reflected sound included in the sound heard.

In three-dimensional sound processing to be performed by information processing device 10, a timing of an arrival of each of a direct sound and a reflected sound at user U and an amplitude and a phase of each of the direct sound and the reflected sound are calculated based on the sound signal included in the above-described stream. The direct sound and the reflected sound are then synthesized to generate a sound signal (to be stated as an output signal) indicating a sound to be output from a loudspeaker.

When the speed of a change in an orientation of a user relative to sound source 5 is relatively high, user U has difficulty of hearing a detail of a sound output from a loudspeaker, and may not be able to hear the detail of the sound. In view of the above, enabling user U to hear a detail of a sound output from a loudspeaker is sought after.

Moreover, a sound signal may include a human voice. In this case, user U has difficulty of hearing a detail of a voice output from a loudspeaker, and may not be able to hear the detail of the voice. The need for user U to hear a detail of a voice is typically greater than the need for hearing a sound other than a voice. In view of the above, enabling user U to hear a detail of a voice output from a loudspeaker is also sought after. Here, a voice indicates a human utterance.

Information processing device 10 contributes to preventing difficulty of hearing a detail of a sound that a sound source outputs by adjusting relative positions or relative orientations of user U and sound source 5 based on a rate of change at which the speed of the relative positions or the relative orientations of user U and sound source 5 changes.

Figure 2:
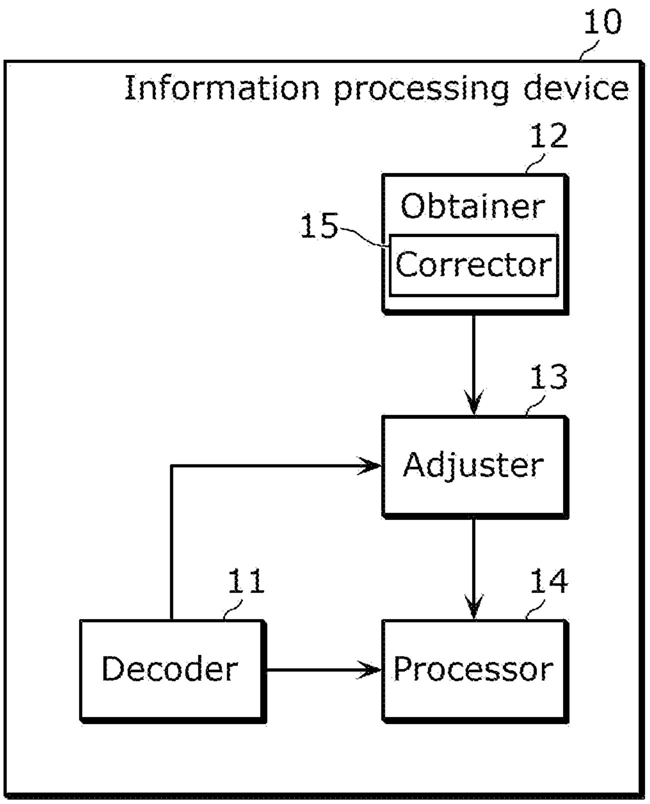
FIG. 2 is a block diagram illustrating a functional configuration of an information processing device according to the embodiment.

FIG. 2 is a block diagram illustrating a functional configuration of information processing device 10 according to the embodiment.

As illustrated in FIG. 2, information processing device 10 includes, as functional units, decoder 11, obtainer 12, adjuster 13, processor 14, and corrector 15. The functional units included in information processing device 10 may be implemented by a processor (e.g., central processing unit (CPU) not illustrated) executing a predetermined program using memory (not illustrated).

Decoder 11 is a functional unit that decodes a stream. The stream includes, specifically, position and orientation information (corresponding to first position and orientation information) indicating a position and an orientation of sound source 5 in space S and a sound signal indicating a sound that sound source 5 outputs. The stream may include type information indicating whether the sound that sound source 5 outputs is a human voice or not.

Decoder 11 supplies the sound signal obtained by decoding the stream to processor 14. In addition, decoder 11 supplies the position and orientation information obtained by decoding the stream to adjuster 13. Note that the stream may be obtained by information processing device 10 from an external device or may be prestored in a storage device included in information processing device 10.

The stream is a stream encoded in a predetermined format. For example, the stream is encoded in a format of MPEG-H 3D Audio (ISO/IEC 23008-3), which may be simply called MPEG-H 3D Audio.

The position and orientation information indicating the position and orientation of sound source 5 is, to be more specific, information on six degrees of freedom including coordinates (x, y, and z) of sound source 5 in the three axial directions and angles (the yaw angle, pitch angle, and roll angle) of sound source 5 with respect to the three axes. The position and orientation information on sound source 5 can identify the position and orientation of sound source 5. Note that the coordinates are coordinates in a coordinate system that are appropriately set. An orientation is an angle with respect to the three axes which indicates a predetermined direction (to be stated as a reference direction) predetermined for sound source 5. The reference direction may be a direction toward which sound source 5 outputs a sound or may be any direction that can be uniquely determined for sound source 5.

The stream may include, for each of one or more sound sources position and orientation information indicating the position and orientation of sound source 5 and a sound signal indicating a sound that sound source 5 outputs.

Obtainer 12 is a functional unit that obtains the position and orientation of the head of user U in space S. Obtainer 12 obtains, using a sensor etc., position and orientation information (second position and orientation information) including information (to be stated as position information) indicating the position of the head of user U and information (to be stated as orientation information) indicating the orientation of the head of user U. The position and orientation information on the head of user U which is obtained by obtainer 12 may be corrected by corrector 15 (to be described later). Obtainer 12 supplies the position and orientation information on the head of user U to adjuster 13. The position and orientation information to be supplied by obtainer 12 to adjuster 13 is obtained position and orientation information on the head of user U. When a correction is made by corrector 15, the position and orientation information to be supplied by obtainer 12 to adjuster 13 is corrected position and orientation information on the head of user U.

The position and orientation information on the head of user U is, to be more specific, information on six degrees of freedom including coordinates (x, y, and z) of the head of user U in the three axial directions and angles (the yaw angle, pitch angle, or roll angle) of the head of user U with respect to the three axes. The position and orientation information on the head of user U can identify the position and orientation of the head of user U. Note that the coordinates are coordinates in a coordinate system common to the coordinate system determined for sound source 5. The position may be determined as a position in a predetermined positional relationship from a predetermined position (e.g., the origin point) in the coordinate system. The orientation is an angle with respect to the three axes which indicates the direction toward which the head of user U faces.

The sensor, etc. are an inertial measurement unit (IMU), an accelerometer, a gyroscope, and/or a magnetometric sensor, or a combination thereof. The sensor, etc. are assumed to be worn on the head of user U. The sensor, etc. may be fixed to earphones or headphones worn by user U.

Adjuster 13 is a functional unit that adjusts the position and orientation information on user U in space S using parameters (i.e., a spatial resolution and a time response length) of the three-dimensional sound processing performed by processor 14. Adjuster 13 adjusts the position information on the head of user U obtained by obtainer 12 by changing the position information to any value of an integer multiple of a spatial resolution. When the position information is changed, adjuster 13 may adopt, from among a plurality of values that are integer multiples of the spatial resolution, a value closest to the position information on the head of user U obtained by obtainer 12. Adjuster 13 supplies, to processor 14, the adjusted position information on the head of user U and the orientation information on the head of user U.

Processor 14 is a functional unit that performs, on the sound signal obtained by decoder 11, the three-dimensional sound processing that is digital acoustic processing. Processor 14 includes a plurality of filters used for the three-dimensional sound processing. The filters are used for computations performed for adjusting the amplitude and phase of the sound signal for each of frequencies, for example.

Processor 14 calculates, in the three-dimensional sound processing, propagation paths of a direct sound and a reflected sound that arrive from sound source 5 to user U, and timings of the arrival of the direct sound and reflected sound at user U. Processor 14 also calculates the amplitude and phase of sounds that arrive at user U by applying, for each of ranges of angle directions with respect to the head of user U, a filter according to the range to a signal indicating a sound (a direct sound and a reflected sound) that arrives at user U from the range.

Processor 14 uses relative positions and relative orientations of user U and sound source 5 to perform the three-dimensional sound processing. Relative positions and relative orientations of user U and sound source 5 may be expressed as shown in [Math. 3] using [Math. 1] and [Math. 2] as follows (see FIG. 1).

$$\sqrt{r} \quad \text{[Math. 1]}$$

The above shows a vector indicating the position and orientation of sound source 5.

$$\sqrt{r_0} \quad \text{[Math. 2]}$$

The above shows a vector indicating the position and orientation of user U.

$$D=|\sqrt{r}-\sqrt{r_0}| \quad \text{[Math. 3]}$$

Corrector 15 corrects information indicating the position and orientation of the head of user U which is obtained by obtainer 12. Specifically, corrector 15 makes a correction to reduce a rate of change at which the speed of a position or an orientation indicated in information (corresponding to second position and orientation information) indicating the position and orientation of the head of user U which is supplied from obtainer 12 changes. When the above-described rate of change exceeds a threshold, the correction to be made by corrector 15 may be, specifically, a correction to set the rate of change at which the speed of the position or the orientation indicated in the corrected second position and orientation information changes as a threshold. A correction to be made by corrector 15 can be said as a correction for preventing an abrupt change in the position or the orientation indicated in the second position and orientation information. The threshold here can be determined according to a predetermined standard relating to a rate of change at which the speed of the position or the orientation changes.

In addition, when the above-described rate of change exceeds the threshold, the correction to be made by corrector 15 may be a correction to cause the corrected second position and orientation information to indicate a position or an orientation that is delayed from the position or the orientation indicated in obtained second position and orientation information. The rate of change at which the speed of the position or the orientation changes here may be calculated as a second derivative value of the position or the orientation with respect to time, for example.

Moreover, when type information indicates that a sound indicated in a sound signal is a human voice, corrector 15 may reduce a threshold before making a correction. Alternatively, when the type information indicates that the sound indicated in the sound signal is not a human voice, corrector 15 may increase the threshold before making a correction.

Note that when type information indicates that a sound indicated in a sound signal is not a human voice, corrector 15 need not make a correction. In other words, a correction may be prohibited.

A spatial resolution for the three-dimensional sound processing will be described with reference to FIG. 3.

Figure 3:
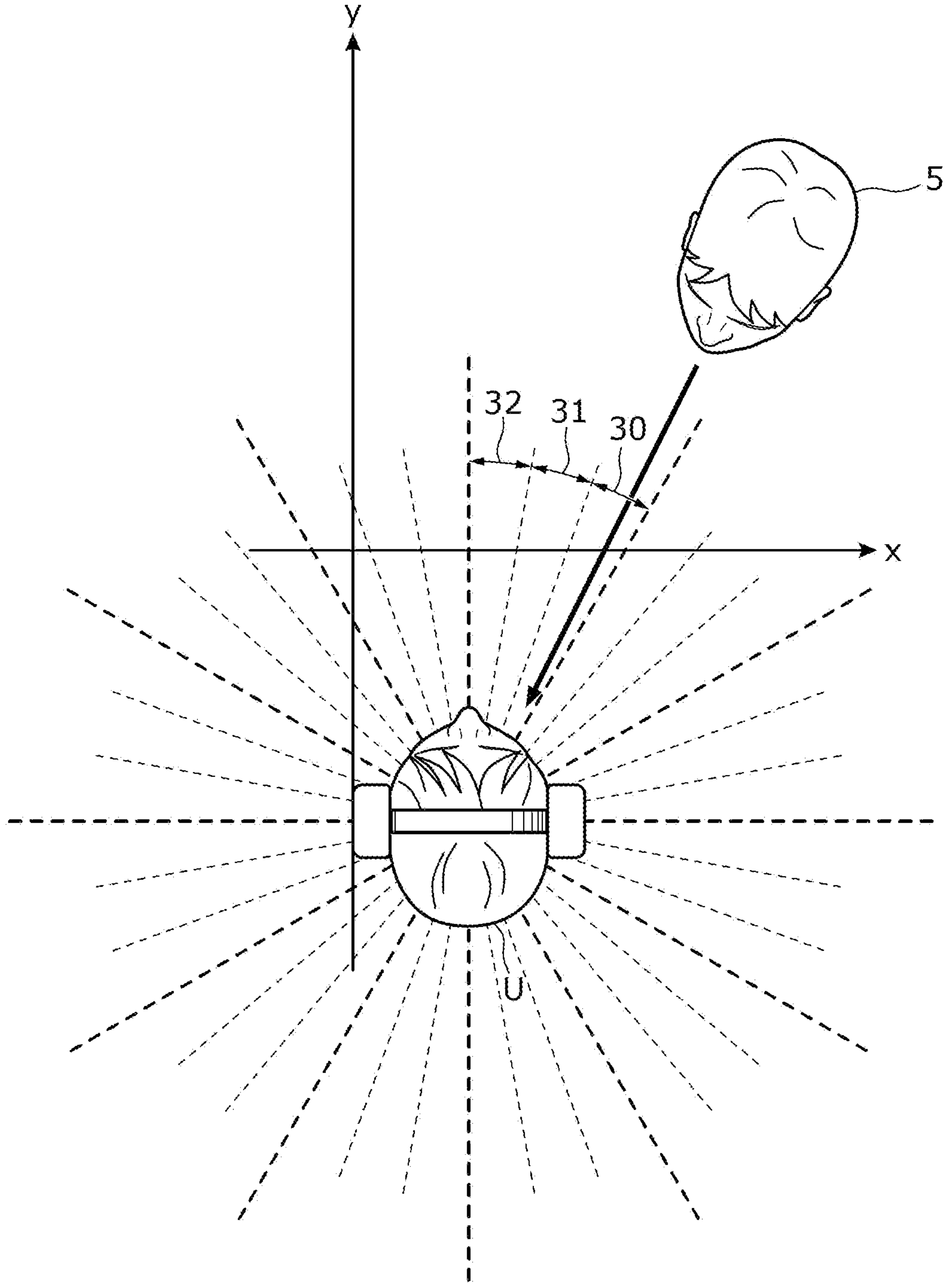
FIG. 3 is a diagram illustrating a spatial resolution for three-dimensional sound processing according to the embodiment.

FIG. 3 is a diagram illustrating a spatial resolution and a time response length for the three-dimensional sound processing according to the embodiment.

As illustrated in FIG. 3, a spatial resolution for the three-dimensional sound processing is a resolution of a range of an angle direction with respect to user U.

Processor 14 applies, to a sound signal, a filter corresponding to each of angular ranges 30, 31, 32 and so on with respect to user U to calculate the sound signal indicating a sound arriving at user U from each of angular ranges 30, 31, 32 and so on (see FIG. 3). The sound arriving at user U from each of angular ranges 30, 31, 32 and so on may consist of a direct sound and a reflected sound arriving from sound source 5 to user U.

Here, a high spatial resolution corresponds to a narrow angular range. Alternatively, a low spatial resolution corresponds to a wide angular range. An angular range is equivalent to a unit to which the same filter is applied.

A time response length for the three-dimensional sound processing will be described with reference to FIG. 4.

Figures 4, 5:
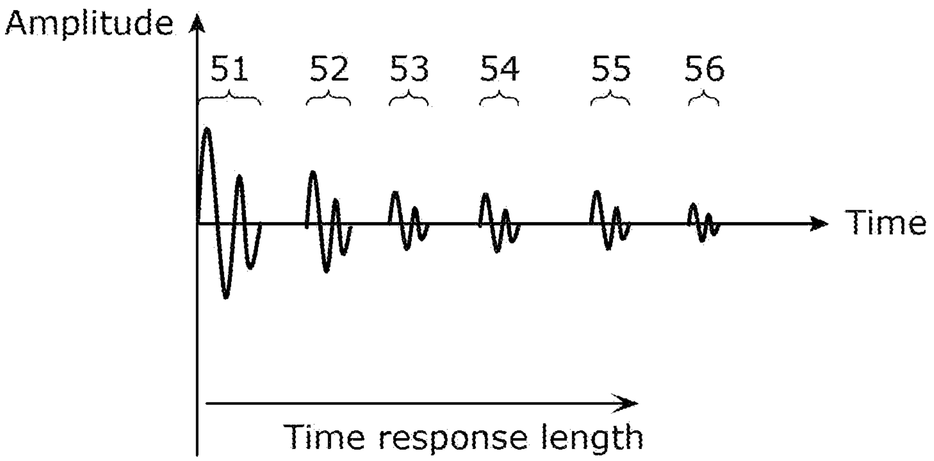
FIG. 4 is a diagram illustrating response time lengths for the three-dimensional sound processing according to the embodiment.
FIG. 5 is a diagram illustrating a first example of parameters of the three-dimensional sound processing according to the embodiment.

FIG. 4 is a diagram illustrating time response lengths for the three-dimensional sound processing according to the embodiment.

FIG. 4 shows a sound signal generated by the three-dimensional sound processing. The sound signal includes waveform 51 corresponding to a direct sound that arrives at user U from sound source 5, and waveforms 52, 53, 54, 55, and 56 corresponding to reflected sounds that arrive at user U from sound source 5. Each of waveforms 52, 53, 54, 55, and 56 corresponding to the reflected sounds is delayed from the direct sound by a delay time determined based on the positional relationship between sound source 5, user U, and a wall surface in space S. Moreover, the amplitude of each of waveforms 52, 53, 54, 55, and 56 is reduced due to a propagation distance and reflection off the wall surface. A delay time is determined in a range of about 10 msec to about 100 msec.

A time response length is an indicator showing a degree of magnitude of the above-described delay time. A delay time increases as a time response length increases. Alternatively, a delay time reduces as a time response length reduces.

Note that a time response length is strictly an indicator showing the magnitude of a delay time, and does not indicate a delay time of a waveform corresponding to a reflected sound. For example, although the time interval from waveform 51 to waveform 55 and the time response length from waveform 51 to waveform 55 are substantially equal in FIG. 4, the time interval from waveform 51 to waveform 54 and the time response length from waveform 51 to waveform 54 may be substantially equal. Moreover, the time interval from waveform 51 to waveform 56 and the time response length from waveform 51 to waveform 56 may be substantially equal.

FIG. 5 is a diagram illustrating parameters of the three-dimensional sound processing according to the embodiment.

FIG. 5 illustrates an association table showing an association between (i) a spatial resolution and a time response length which are parameters of the three-dimensional sound processing and (ii) each of ranges of distance D between user U and sound source 5.

In FIG. 5, a lower spatial resolution is associated with a larger distance D between the head of user U and sound source 5. Moreover, a greater time response length is associated with a larger distance D between the head of user U and sound source 5.

For example, distance D of less than 1 m is associated with a spatial resolution of 10 degrees and a time response length of 10 msec.

Likewise, distance D of more than or equal to 1 m to less than 3 m, distance D of more than or equal to 3 m to less than 20 m, and distance D of more than or equal to 20 m are respectively associated with a spatial resolution of 30 degrees, a spatial resolution of 45 degrees, and a spatial resolution of 90 degrees and a time response length of 50 msec, a time response length of 200 msec, and a time response length of 1 sec.

Processor 14 holds the association table of distances D and spatial resolutions illustrated in FIG. 5. Processor 14 consults the association table, and obtains a spatial resolution and a time response length associated with distance D between the head of user U obtained from obtainer 12 and sound source 5.

As described above, processor 14 sets a lower spatial resolution, namely a value indicating the lower spatial resolution, for a larger distance D between the head of user U and sound source 5 in space S. In addition, processor 14 sets a greater time response length, namely a value indicating the greater time response length, for a larger distance D between the head of user U and sound source 5 in space S.

Hereinafter, a correction made to position and orientation information by corrector 15 will be described. As position information, a yaw angle that is an angle with respect to the z axis of the head of user U is used here for description. However, a coordinate (x, y, or z) of the head of user U or another angle (a pitch angle or a roll angle) can be used to provide the same description.

Figure 6:
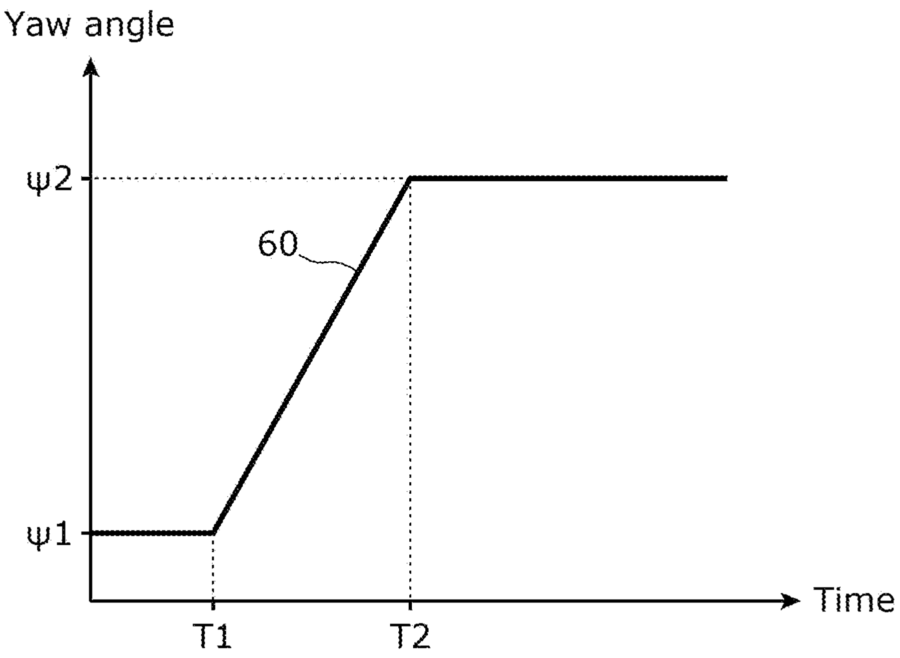
FIG. 6 is a first diagram illustrating changes in a yaw angle according to the embodiment.

FIG. 6 is a first diagram illustrating changes in a yaw angle according to the embodiment. FIG. 6 illustrates temporal changes in yaw angle 60 of the head of user U obtained by obtainer 12. Yaw angle 60 shown in FIG. 6 indicates an orientation of the head of user U relative to the orientation of sound source 5.

As illustrated in FIG. 6, yaw angle 60 is constant at ψ1 before time T1, is linearly increased to ψ2 with respect to time from time T1 to time 2, and is constant at ψ2 after time T2. Here, an inclination of ψ(t) discontinuously changes at time T1 and time T2. Specifically, the orientation has been abruptly changed at time T1 and time T2. In other words, the rate of change at which the speed of the orientation changes is great at T1 and T2.

Figure 7:
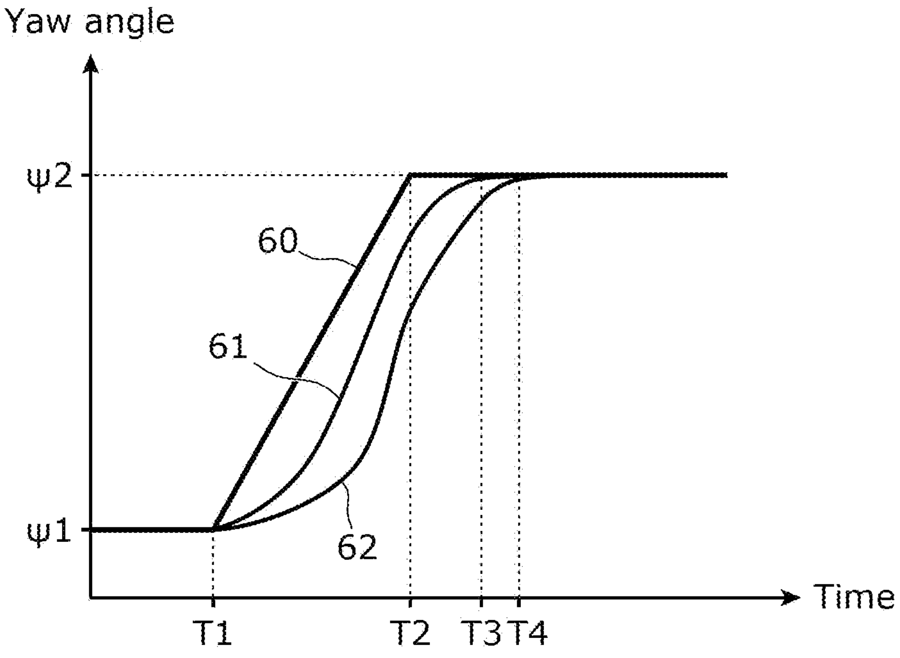
FIG. 7 is a second diagram illustrating changes in the yaw angle according to the embodiment.

FIG. 7 is a second diagram illustrating changes in the yaw angle according to the embodiment. FIG. 7 illustrates temporal changes in yaw angles 61 and 62 that are obtained after corrector 15 has made corrections to yaw angle 60 illustrated in FIG. 6.

Yaw angle 61 is obtained as a result of corrector 15 making a correction to yaw angle 60 using a relatively large threshold. Yaw angle 62 is obtained as a result of corrector 15 making a correction to yaw angle 60 using a relatively small threshold. The above-mentioned "relatively small threshold" is less than the above-mentioned "relatively large threshold".

Corrector 15 makes a correction using a relatively small threshold for a human voice, for example. Alternatively, corrector 15 makes a correction using a relatively large threshold for a sound other than a human voice, for example. Corrector 15 consults type information on a sound signal to be corrected, and reduces a threshold when corrector 15 determines that the sound signal to be corrected is a human voice. Alternatively, corrector 15 increases the threshold when corrector 15 determines that the sound signal to be corrected is not a human voice.

Yaw angle 61 is constant at ψ1 before time T1, is gradually increased from time T1 to time T2, and is constant at ψ2 after time T3.

The temporal changes in the above-described yaw angle 61 can be obtained by corrector 15 making corrections for preventing an abrupt change in the orientation to the temporal changes in yaw angle obtained by obtainer 12.

To be more specific, yaw angle 61 is obtained by making a correction for setting rate of change ψ"(t) of rate of change ψ'(t) of yaw angle ψ(t) with respect to time, which can be obtained from yaw angles ψ(t) repeatedly obtained by obtainer 12, to be less than or equal to a threshold.

For example, using temporal change ψ(t) in yaw angle 60 obtained by obtainer 12, (i) rate of change ψ'(t) of yaw angle ψ(t) with respect to time can be expressed as $\psi'(t)=\psi(t)/\Delta t$, and (ii) rate of change ψ"(t) of rate of change ψ'(t) with respect time can be expressed as $\psi''(t)=\psi'(t)/\Delta t$. Here, Δt denotes a time difference between the time at which yaw angle ψ(t-1) is previously obtained and the time at which yaw angle ψ(t) is obtained this time, and is about 10 msec to about 100 msec, for example.

When Δt can be considered to be sufficiently small for a change in an orientation of the head of user U, rate of change ψ"(t) may be calculated as a second derivative value of yaw angle ψ(t) with respect to time.

When obtainer 12 obtains temporal change ψ(t) in yaw angle corrector 15 calculates ψ'(t) and further calculates ψ"(t). Corrector 15 then determines whether ψ"(t) exceeds threshold Th1. When corrector 15 determines that ψ"(t)

exceeds threshold Th1, corrector 15 makes a correction by calculating a yaw angle that would make ψ"(t) less than or equal to threshold Th1 and setting the yaw angle as ψ(t). More specifically, corrector 15 makes a correction by calculating a yaw angle that would make ψ"(t) equal to threshold Th1 and setting the yaw angle as ψ(t).

Furthermore, when a correction is made to ψ(t), corrector 15 determines whether yaw angle ψ(t+1) to be obtained next needs a correction in the same manner as above using the corrected ψ(t), and makes a correction when a correction is necessary.

As has been described above, temporal changes in yaw angle 61 illustrated in FIG. 7 are obtained. In the temporal changes in yaw angle 61, discontinuities in the inclinations of ψ(t) at time T1 and at time T3, which are included in the temporal changes in yaw angle 60, are removed. In other words, the inclinations of the temporal changes in yaw angle 61 are gradually changed.

Next, yaw angle 62 is constant at ψ1 before time T1, is gradually increased from time T1 to time T2, and is constant at ψ2 after time T4. Time T4 is time ahead of time T3.

The temporal changes in the above-described yaw angle 62 can be obtained by corrector 15 making corrections for preventing an abrupt change in the orientation to the temporal changes in yaw angle obtained by obtainer 12. The magnitude of corrections made by corrector 15 for obtaining the temporal changes in yaw angle 62 is greater than the magnitude of the corrections made by corrector 15 for obtaining the temporal changes in yaw angle 61. In other words, threshold Th2 used by corrector 15 when obtaining the temporal changes in yaw angle 62 is smaller than threshold Th1 used by corrector 15 when obtaining the temporal changes in yaw angle 61.

As a result, discontinuities in the inclinations of ψ(t) at time T1 and at time T3, which are included in the temporal changes in yaw angle 60, are removed in the temporal changes in yaw angle 62. In other words, the inclinations of the temporal changes in yaw angle 62 are even more gradually changed.

Detailed description of calculation processing performed by corrector 15 for obtaining the temporal changes in yaw angle 62 is omitted since the calculation processing is equivalent to calculation processing performed for obtaining yaw angle 61 using threshold Th2 instead of threshold Th1.

Figure 8:
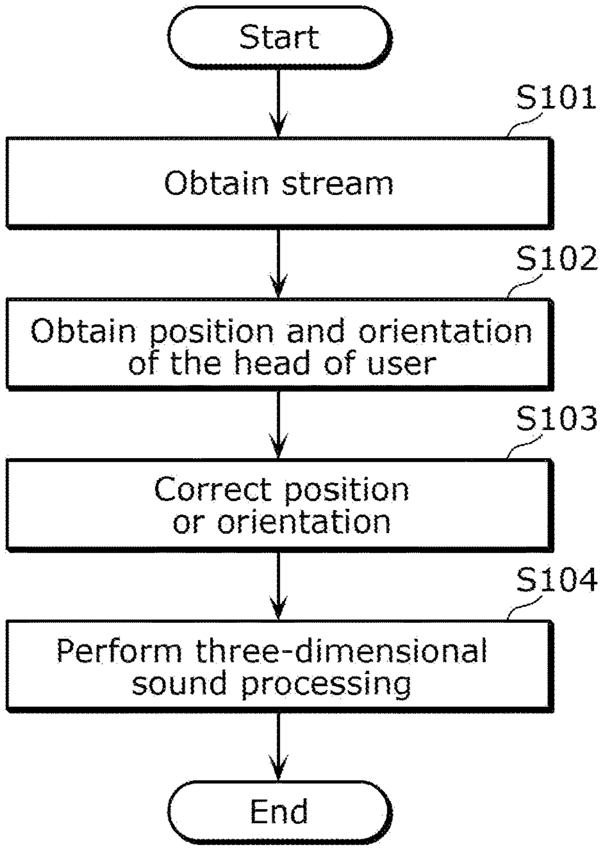
FIG. 8 is a flowchart illustrating processing performed by an information processing device according to the embodiment.

FIG. 8 is a flowchart illustrating processing performed by information processing device 10 according to the embodiment.

As illustrated in FIG. 8, decoder 11 obtains a stream in step S101. The stream includes information (corresponding to first position and orientation information) indicating the position and orientation of sound source 5 and a sound signal indicating a sound that sound source 5 outputs.

In step S102, obtainer 12 obtains information (corresponding to second position and orientation information) indicating the position and orientation of the head of user U.

In step S103, corrector 15 makes a correction to the information indicating the position and orientation of the head of user U which has been obtained by obtainer 12 in step S102. The correction is a correction to set the speed of a change in the position or the orientation indicated in the information to be less than or equal to a threshold.

In step S104, processor 14 performs the three-dimensional sound processing on the sound signal using the corrected position or the corrected orientation that has been corrected in step S103 to generate and output a sound signal to be output by a loudspeaker. The output sound signal is assumed to be transmitted to the loudspeaker, output as a sound, and heard by user U.

With this, information processing device 10 can prevent difficulty of hearing a detail of a sound that a sound source outputs.

Variation of Embodiment

This variation describes an embodiment of further preventing a time difference between timings of a sound signal on which the three-dimensional sound processing is to be performed in an information processing device that prevents difficulty of hearing a detail of a sound that a sound source outputs.

Figure 9:
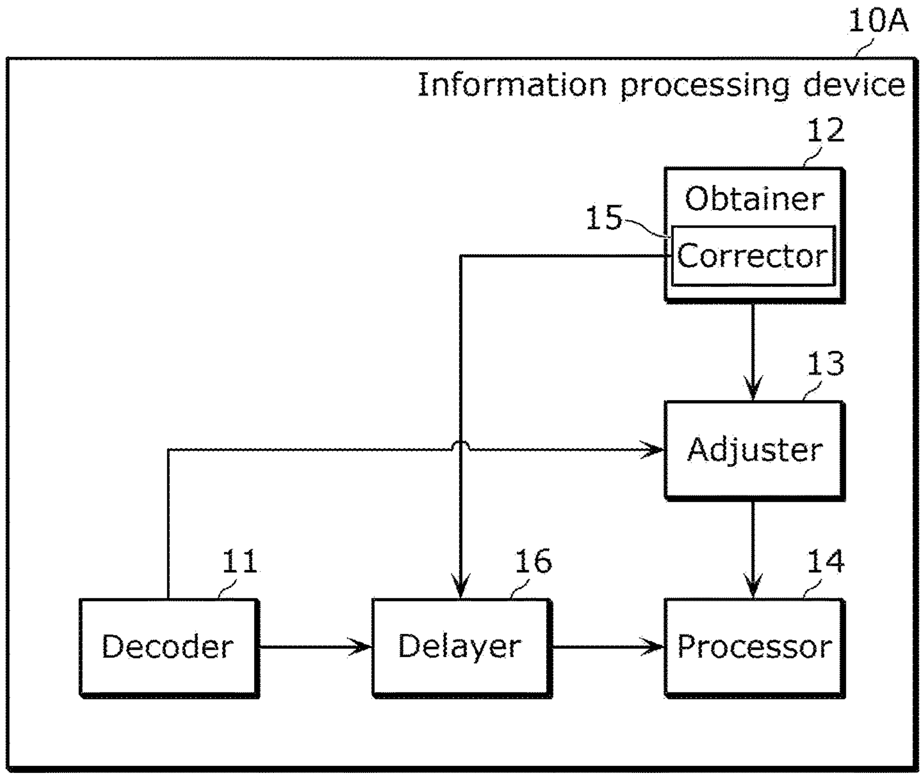
FIG. 9 is a block diagram illustrating a functional configuration of an information processing device according to a variation of the embodiment.

FIG. 9 is a block diagram illustrating a functional configuration of information processing device 10A according to the variation.

As illustrated in FIG. 9, information processing device 10A includes, as functional units, decoder 11, obtainer 12, adjuster 13, processor 14, corrector 15, and delayer 16. The functional units included in information processing device 10A may be implemented by a processor (e.g., central processing unit (CPU) not illustrated) executing a predetermined program using memory (not illustrated).

Decoder 11, obtainer 12, adjuster 13, processor 14, and corrector 15 included in information processing device 10A are the same functional units included in information processing device 10 according to the embodiment. Delayer 16 will be hereinafter described.

Delayer 16 performs delay processing of delaying a sound signal included in a stream. To be more specific, delayer 16 performs delay processing of delaying a sound signal by a time (to be also stated as a delay time) for which a change in the position or the orientation indicated in second position and orientation information is delayed, when corrector 15 delays the change by making a correction. In addition, delayer 16 performs reduction processing of reducing a delay caused by the delay processing (or recovering a delay caused by the delay processing) on a subsequent signal that is a sound signal subsequent to the sound signal on which the delay processing has been performed.

These delay processing and reduction processing can be performed using a known voice speed conversion technique. The voice speed conversion technique can change the reproduction speed of a sound to be reproduced without changing an interval (see NPL 1).

The delay processing that delayer 16 performs will be described with reference to FIG. 10.

Figure 10:
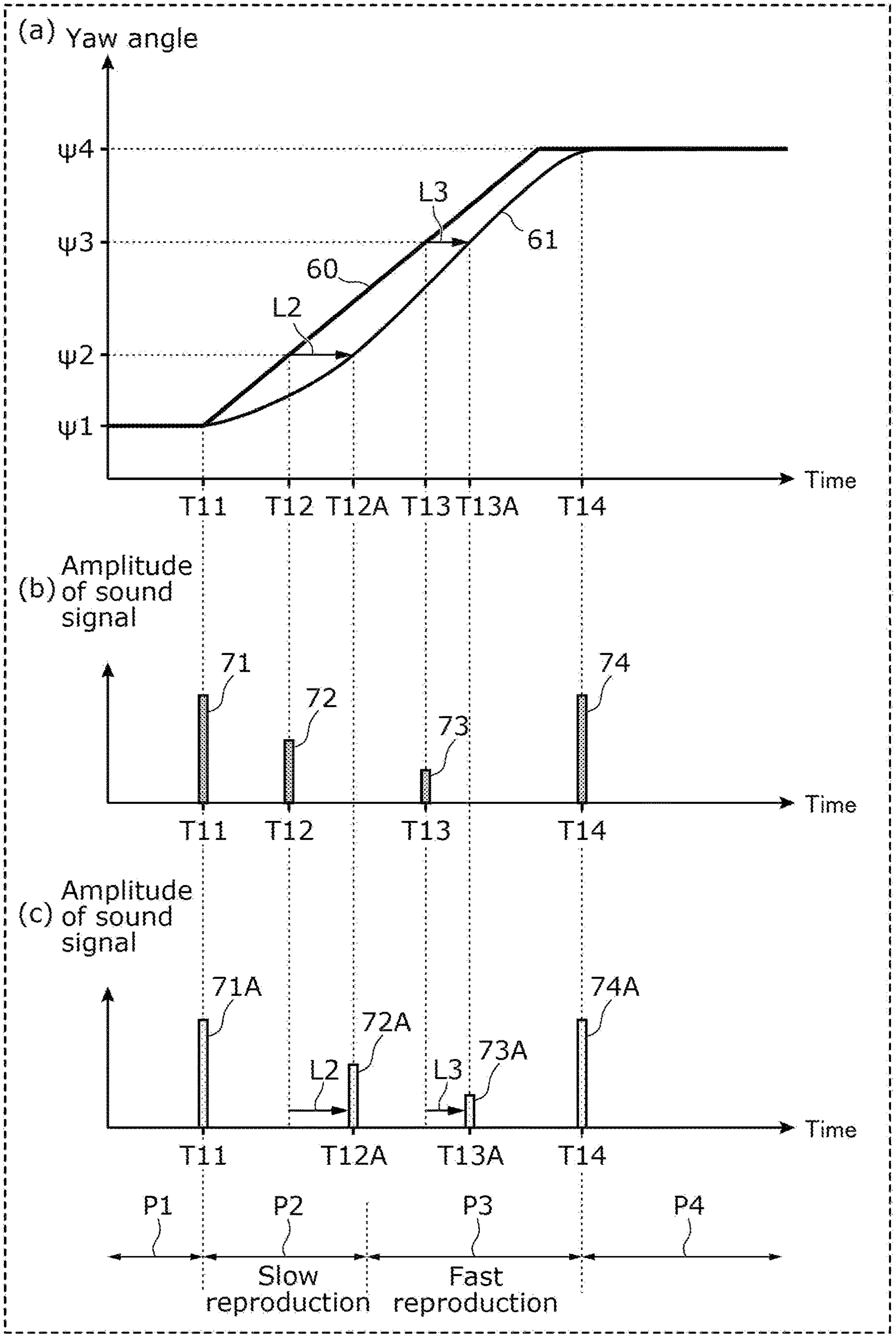
FIG. 10 is a diagram illustrating changes in a yaw angle and delays in a sound signal according to the variation of the embodiment.

FIG. 10 is a diagram illustrating changes in a yaw angle and delays in a sound signal according to the variation.

Part (a) of FIG. 10 illustrates temporal changes in yaw angle of the head of user U and temporal changes in yaw angle 61 to which a correction is made by corrector 15.

As a result of a correction made by corrector 15, yaw angle ψ2 obtained at time T12 by obtainer 12 is corrected such that yaw angle ψ2 is set to be the yaw angle at time T12A that is delayed by time L2 from time T12, for example. In addition, as a result of the correction made by corrector 15, yaw angle ψ3 obtained at time T13 by obtainer 12 is corrected such that yaw angle ψ3 is set to be the yaw angle at time T13A that is delayed by time L3 from time T13, for example. Note that yaw angle ψ1 and yaw angle ψ4 obtained by obtainer 12 at time T11 and time T14, respectively, are not changed by a correction, and thus are the same before and after the above corrections.

Part (b) of FIG. 10 illustrates sound signals included in a stream. Specifically, part (b) of FIG. 10 illustrates, as an example of sound signals included in a stream, sound signal 71 to be reproduced at time T11, sound signal 72 to be reproduced at time T12, sound signal 73 to be reproduced at time T13, and sound signal 74 to be reproduced at time T14. Note that the stream may include a sound signal that is to be reproduced at time other than the above-mentioned time.

Part (c) of FIG. 10 illustrates sound signals on which delay processing or reduction processing has been performed by delayer 16. Specifically, part (c) of FIG. 10 illustrates sound signal 71A to be reproduced at time T11, sound signal 72A to be reproduced at time T12, sound signal 73A to be reproduced at time T13, and sound signal 74A to be reproduced at time T14.

Sound signal 71A is the same as original sound signal 71 to which no correction is made. This is because a correction by corrector 15 is not made to sound signal 71.

Sound signal 72A is a sound signal resulting from sound signal 72 on which delay processing is performed such that original sound signal 72 before a correction is made is to be reproduced at time T12A that is delayed by time L2 from time T12. The delay processing is performed on sound signal 72 by delayer 16 based on the fact that corrector 15 has corrected yaw angle ψ2 at time T12 to set yaw angle ψ2 to be the yaw angle at time T12A that is delayed by time L2 from time T12.

Sound signal 73A is a sound signal resulting from sound signal 73 on which delay processing is performed such that original sound signal 73 before a correction is made is to be reproduced at time T13A that is delayed from time T13. The delay processing is performed on sound signal 73 by delayer 16 based on the fact that corrector 15 has corrected yaw angle ψ3 at time T13 to set yaw angle ψ3 to be the yaw angle at time T13A that is delayed by time L3 from time T13.

Sound signal 74A is the same as original sound signal 74 to which no correction is made. This is because a correction by corrector 15 is not made to sound signal 74.

As described above, delayer 16 provides a delay to a sound signal while gradually increasing a delay time in period P2 that has a tendency to increase the delay time. The foregoing corresponds to slow reproduction of a sound signal.

In addition, delayer 16 provides a delay to a sound signal while gradually reducing a delay time in period P3 that has a tendency to reduce the delay time. The foregoing corresponds to fast reproduction of a sound signal.

Note that delayer 16 does not perform the delay processing or reduction processing in periods P1 and P4 during which a correction by corrector 15 is not made to sound signals.

Figure 11:
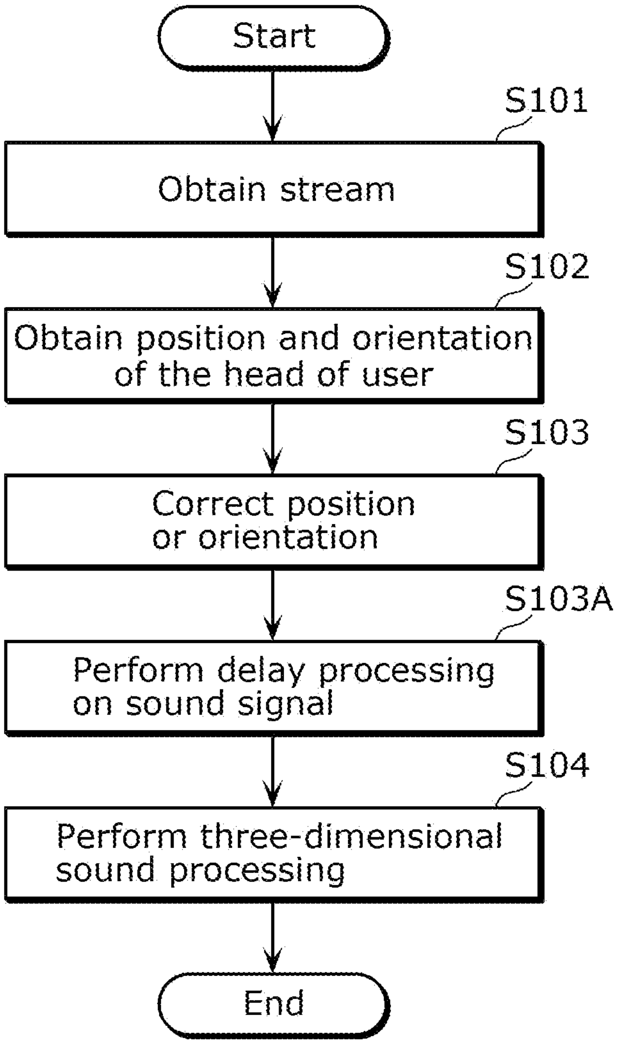
FIG. 11 is a flowchart illustrating processing performed by the information processing device according to the variation of the embodiment.

FIG. 11 is a flowchart illustrating processing performed by information processing device 10A according to the variation.

Steps S101 through S103 are the same as the steps having the same step numbers in the embodiment.

In step S103A, delayer 16 performs delay processing on a sound signal. Note that when delayer 16 has already performed the delay processing on the sound signal, delayer 16 performs reduction processing of reducing a delay caused by the delay processing on a subsequent signal that is a sound signal subsequent to the sound signal on which the delay processing has been performed.

In step S104, processor 14 performs the three-dimensional sound processing on the sound signal using a position or an orientation after the delay processing or reduction processing has been performed in step S103A to generate and output a sound signal to be output by a loudspeaker. The output sound signal is assumed to be transmitted to the loudspeaker, output as a sound, and heard by user U.

With this, information processing device 10A can prevent difficulty of hearing a detail of a sound that a sound source outputs, and also a time difference between timings of a sound signal on which the three-dimensional sound processing is to be performed.

As has been described above, an information processing device according to the embodiment and the variation performs three-dimensional sound processing using a corrected position or a corrected orientation of the head of a user. Therefore, it is possible to prevent a relatively big change in a sound that the user is to hear, which may occur when a relatively big change has occurred in the position or the orientation of the head of the user. With this, a relatively big change in the position of a sound source that the user becomes aware of by hearing a sound is prevented, and thus the user can readily hear a detail of the sound that the sound source outputs. As described above, the above-described information processing method can prevent difficulty of hearing a detail of a sound that a sound source outputs.

In addition, when a rate of change at which the speed of the position or the orientation of the head of a user changes relative to a sound source exceeds a threshold, the information processing device corrects information indicating the position or the orientation such that the rate of change is set as a threshold. Therefore, the rate of change at which the speed of the position or the orientation of the head of the user changes relative to the sound source can be set to be less than or equal to the threshold. As a consequence, it is possible to prevent a relatively big change in a sound that the user is to hear, which may occur when a relatively big change that exceeds a predetermined standard has occurred in the position or the orientation of the head of the user. As described above, the above-described information processing method can prevent difficulty of hearing a detail of a sound that a sound source outputs.

Moreover, when a rate of change at which the speed of the position or the orientation of the head of a user changes relative to a sound source exceeds a threshold, the information processing device makes a correction such that the change is delayed. Therefore, the rate of change at which the speed of the position or the orientation of the head of the user changes relative to the sound source can be set to be less than or equal to the threshold. As a consequence, it is possible to prevent a relatively big change in a sound that the user is to hear, which may occur when a relatively big change that exceeds a predetermined standard has occurred in the position or the orientation of the head of the user. As described above, the above-described information processing method can prevent difficulty of hearing a detail of a sound that a sound source outputs.

In addition, the information processing device can readily obtain a rate of change at which the speed of the position or the orientation of the head of a user changes relative to a sound source, using a second derivative value of the position or the orientation of the head of the user relative to the sound source with respect to time. The position or the orientation of the head of the user can be appropriately corrected using the rate of change. Therefore, the above-described information processing method can more readily prevent difficulty of hearing a detail of a sound that a sound source outputs.

Moreover, the information processing device makes a correction using a smaller threshold for the three-dimensional sound processing to be performed on a human voice. Accordingly, a big change in the speed of a change in the position or the orientation of the head of a user relative to a sound source is prevented, particularly for the voice. Therefore, the above-described information processing method can further prevent difficulty of hearing a detail of a human voice that a sound source outputs.

In addition, the information processing device makes a correction using a larger threshold for the three-dimensional sound processing to be performed on a sound other than a human voice. This allows a bigger change in the speed of a change in the position or the orientation of the head of a user relative to a sound source, and thus a delay in the change in the position or the orientation of the head of the user is reduced. The above has an advantage of enabling a reduction in a delay in the three-dimensional sound processing when there is less need to cause a detail of a sound other than a human voice to be readily heard as compared to a human voice. Therefore, the above-described information processing method can prevent difficulty of hearing a detail of a sound that a sound source outputs, while preventing a delay in the three-dimensional sound processing.

Moreover, the information processing device does not make a correction for the three-dimensional sound processing to be performed on a sound other than a human voice. Accordingly, a delay in a change in the position or the orientation of the head of a user does not occur. The above has an advantage of enabling a further reduction in a delay in the three-dimensional sound processing when there is less need to cause a detail of a sound other than a human voice to be readily heard as compared to a human voice. Therefore, the above-described information processing method can prevent difficulty of hearing a detail of a sound that a sound source outputs, while preventing a delay in the three-dimensional sound processing.

In addition, the information processing device delays a sound signal by a delay time for which a change in the position or the orientation indicated in second position and orientation information is delayed by a correction. Accordingly, it is possible to prevent a time difference that may occur between the three-dimensional sound processing to be performed based on the position or the orientation of the head of a user and a sound signal on which the three-dimensional sound processing is to be performed. Therefore, the above-described information processing method can further prevent difficulty of hearing a detail of a sound that a sound source outputs.

Moreover, the information processing device contributes to recovering, by reduction processing, a delay in a sound signal that is caused to be delayed by delay processing. Therefore, the above-described information processing method can further prevent difficulty of hearing a detail of a sound that a sound source outputs.

It should be noted that each of the elements in the above-described embodiments may be configured as a dedicated hardware product or may be implemented by executing a software program suitable for the element. Each element may be implemented as a result of a program execution unit, such as a central processing unit (CPU), processor or the like, loading and executing a software program stored in a storage medium such as a hard disk or a semiconductor memory. Here, software that implements the information processing device according to the above-described embodiments is a program as described below.

The above-mentioned program is, specifically, a program that causes a computer to execute an information processing method including: obtaining a stream including (i) first position and orientation information indicating a position and an orientation of a sound source and (ii) a sound signal indicating a sound that the sound source outputs; obtaining second position and orientation information indicating a position and an orientation of a head of a user; and making a correction to reduce a rate of change at which a speed of the position or the orientation indicated in the second position and orientation information obtained changes relative to the position or the orientation of the sound source indicated in the first position and orientation information, to obtain the second position and orientation information to be used for three-dimensional sound processing to be performed on the sound signal, the three-dimensional sound processing being performed using the first position and orientation information and the second position and orientation information.

The information processing device according to one or more aspects has been hereinbefore described based on the embodiments, but the present disclosure is not limited to these embodiments. The scope of the one or more aspects of the present disclosure may encompass embodiments as a result of making, to the embodiments, various modifications that may be conceived by those skilled in the art and combining elements in different embodiments, as long as the resultant embodiments do not depart from the scope of the present disclosure.

INDUSTRIAL APPLICABILITY

The present disclosure is applicable to information processing devices that perform three-dimensional sound processing.

The invention claimed is:

1. An information processing method comprising:

obtaining a stream including (i) first position and orientation information indicating a position and an orientation of a sound source and (ii) a sound signal indicating a sound that the sound source outputs;

obtaining second position and orientation information indicating a position and an orientation of a head of a user; and making a correction to reduce a rate of change at which a speed of the position or the orientation indicated in the second position and orientation information obtained changes relative to the position or the orientation of the sound source indicated in the first position and orientation information, to obtain the second position and orientation information to be used for three-dimensional sound processing to be performed on the sound signal, the three-dimensional sound processing being performed using the first position and orientation information and the second position and orientation information, wherein, in the making of the correction:

when the rate of change exceeds a threshold, the second position and orientation information is corrected to set, as the threshold, a rate of change at which a speed of the position or the orientation indicated in the second position and orientation information corrected changes.

2. The information processing method according to claim 1, wherein in the making of the correction:

when the rate of change exceeds a threshold, the second position and orientation information is further corrected to indicate the position or the orientation that is delayed from the position or the orientation indicated in the second position and orientation information obtained.

3. The information processing method according to claim 1, wherein the rate of change at which the speed of the position or the orientation changes is a second derivative value of the position or the orientation with respect to time.

4. The information processing method according to claim 1, wherein the stream further includes type information indicating whether the sound indicated by the sound signal is a human voice or not, and in the making of the correction:

when the type information indicates that the sound indicated by the sound signal is a human voice, the correction is made after the threshold is reduced.

5. The information processing method according to claim 1, wherein the stream further includes type information indicating whether the sound indicated by the sound signal is a human voice or not, and in the making of the correction:

when the type information indicates that the sound indicated by the sound signal is not a human voice, the correction is made after the threshold is increased.

6. The information processing method according to claim 1, wherein the stream further includes type information indicating whether the sound indicated by the sound signal is a human voice or not, and in the making of the correction:

when the type information indicates that the sound indicated by the sound signal is not a human voice, the correction is prohibited.

7. The information processing method according to claim 2, wherein in the making of the correction, delay processing of delaying the sound signal by a delay time is further performed, the delay time being a time for which a change in the position or the orientation indicated in the second position and orientation information is delayed by the correction.

8. The information processing method according to claim 7, wherein in the making of the correction, reduction processing of reducing a delay caused by the delay processing is further performed on a subsequent signal that is a sound signal subsequent to the sound signal on which the delay processing has been performed.

9. An information processing device comprising:

a decoder that obtains a stream including (i) first position and orientation information indicating a position and an orientation of a sound source and (ii) a sound signal indicating a sound that the sound source outputs;

an obtainer that obtains second position and orientation information indicating a position and an orientation of a head of a user; and a corrector that makes a correction to reduce a rate of change at which a speed of the position or the orientation indicated in the second position and orientation information obtained changes relative to the position or the orientation of the sound source indicated in the first position and orientation information, to obtain the second position and orientation information to be used for three-dimensional sound processing to be performed on the sound signal, the three-dimensional sound processing being performed using the first position and orientation information and the second position and orientation information, wherein, in the making of the correction:

when the rate of change exceeds a threshold, the corrector corrects the second position and orientation information to set, as the threshold, a rate of change at which a speed of the position or the orientation indicated in the second position and orientation information corrected changes.

10. A non-transitory computer-readable recording medium having recorded thereon a computer program for causing a computer to execute the information processing method according to claim 1.

* * * * *